United States Patent
Kondoh et al.

[11] Patent Number: 5,975,256
[45] Date of Patent: Nov. 2, 1999

[54] DRUM BRAKE ESPECIALLY FOR A TWO-WHEELED VEHICLE

[75] Inventors: Katsuyoshi Kondoh; Yoshishige Takano, both of Hyogo, Japan

[73] Assignee: Sumitomo Electric Industries, Ltd., Osaka, Japan

[21] Appl. No.: 08/877,444

[22] Filed: Jun. 17, 1997

[30] Foreign Application Priority Data

Jun. 19, 1996 [JP] Japan ................................... 8-180032

[51] Int. Cl.⁶ ...................................................... F16D 69/00
[52] U.S. Cl. ................................ 188/251 M; 188/251 A; 75/231
[58] Field of Search ......................... 188/251 M, 251 A, 188/218 R, 218 XL, 344; 75/231, 247

[56] References Cited

U.S. PATENT DOCUMENTS

| | | | |
|---|---|---|---|
| 3,021,592 | 2/1962 | Herron et al. | 29/182.5 |
| 4,393,960 | 7/1983 | Mazur et al. | 188/62 |
| 5,103,942 | 4/1992 | Schmitt | 188/251 R |
| 5,279,638 | 1/1994 | Asada et al. | 75/235 |
| 5,303,617 | 4/1994 | Asada et al. | 75/231 |
| 5,326,384 | 7/1994 | Asada et al. | 75/231 |
| 5,460,639 | 10/1995 | Kondoh | 75/231 |
| 5,501,833 | 3/1996 | Kondoh | 419/33 |
| 5,518,519 | 5/1996 | Kondoh et al. | 75/231 |

FOREIGN PATENT DOCUMENTS

| | | |
|---|---|---|
| 56-120787 | 9/1981 | Japan . |
| 56-133441 | 10/1981 | Japan . |
| 02011936 | 1/1990 | Japan . |
| 05331451 | 12/1993 | Japan . |

*Primary Examiner*—Robert J. Oberleitner
*Assistant Examiner*—Pamela J. Lipka
*Attorney, Agent, or Firm*—W. F. Fasse; W. G. Fasse

[57] ABSTRACT

A roller brake or drum brake for a two-wheeler includes a guide case rotating with a wheel, a ring of a sintered copper alloy that is fixedly fitted into the guide case, and a brake shoe of an iron material that is pressed against the inner peripheral surface of the ring thereby exhibiting a braking effect. The sintered copper alloy forming the ring contains hard particles dispersed in the interior of respective grains of copper alloy powder forming the matrix.

34 Claims, 6 Drawing Sheets

DRUM BRAKE ESPECIALLY FOR A TWO-WHEELED VEHICLE

BACKGROUND OF THE INVENTION

1. Field of the Invention

The present invention relates to a braking device employed for a two-wheeler such as a bicycle or a motorcycle, and more particularly, it relates to a roller brake or drum brake for braking a two-wheeler under dry frictional sliding conditions without a solid or semisolid lubricating component such as grease or oil.

2. Description of the Background Art

FIGS. 1A and 1B show a conventional drum brake for a two-wheeled vehicle, which is generally called a roller brake for a two-wheeler herein. This roller brake comprises a guide case 1 which is fixed to a wheel and rotates with this wheel, and a brake shoe 2 which is pressed against the inner peripheral surface of the guide case 1 to exhibit a braking effect. The brake shoe 2 has an outer peripheral surface which is substantially identical in radius of curvature to the inner peripheral surface of the guide case 1.

In the conventional roller brake, both the guide case 1 and the brake shoe 2 are made of steel or an iron alloy. In order to prevent a discomfort phenomenon such as squeaking or chattering during braking, seizing of the guide case 1 and the brake shoe 2, or locking causing adhesion between the guide case 1 and the brake shoe 2, the inner peripheral surface of the guide case 1 is grooved in the conventional roller brake for allowing intervention of a solid or semisolid lubricant such as grease or oil.

When the lubricant such as grease intervenes between the guide case 1 and the brake shoe 2, however, the braking force is disadvantageously reduced although the lubricity is improved. In this case, the roller brake can exhibit only a small braking force of about 0.1 in terms of the friction coefficient, for example. If maintenance such as supplementation of the lubricant such as grease is neglected, the grease or the like intervening between the guide case 1 and the brake shoe 2 is used up, which will result in locking of the brake shoe and the guide case.

Recent high-performance two-wheelers aim to avoid the use of the lubricant such as grease, in order to improve the braking force for attaining a friction coefficient of at least about 0.1. However, it has been recognized that locking is caused by adhesion when a two-wheeler is braked under dry sliding conditions without intervention of grease in case of employing a conventional brake material such as a friction material for a brake disclosed in Japanese Patent Laying-Open No. 56-133441 (1981), 56-120787 (1981), 2-11936 (1990) or 5-331451 (1993), for example. Thus, further improvement is necessary for a brake material to be used in such an application.

SUMMARY OF THE INVENTION

An object of the present invention is to provide a roller brake for a two-wheeler which causes neither seizing nor locking when braking the two-wheeler under dry sliding conditions without intervention of a lubricant such as grease.

Another object of the present invention is to provide a roller brake that is applicable to a wide-range of two-wheelers including a high-performance two-wheeler which is exposed to a high load of pressing force of 50 to 100 kgf/cm$^2$ for braking transmitted from a brake lever, and general two-wheelers such as a household two-wheeler and a children's two-wheeler which are exposed to a relatively small load of pressing force of 10 to 50 kgf/cm$^2$ for braking.

Still another object of the present invention is to provide a roller brake for a two-wheeler which can exhibit a friction coefficient in the range of 0.15 to 0.5.

A further object of the present invention is to provide a roller brake at a low cost.

The inventors have made various experiments and studies, to develop a roller brake for a two-wheeler which can stably exhibit a friction coefficient in the range of 0.15 to 0.5, preferably in the range of 0.2 to 0.4, with neither seizing, nor locking, nor squeaking nor vibration when exposed to braking pressing force of about 10 to 100 kgf/cm$^2$ under dry sliding conditions without intervention of a lubricant such as grease or oil.

In more concrete terms, the inventive roller brake for a two-wheeler comprises a guide case, a ring, and a brake shoe. The guide case is fixed to a wheel of a two-wheeler, and rotates with this wheel. The ring is prepared from a sintered copper alloy, and fixedly fitted into the guide case. The brake shoe is prepared from an iron material, and pressed against the inner peripheral surface of the ring, thereby exhibiting a braking effect.

Preferably, the sintered copper alloy contains hard particles dispersed in its matrix.

In a preferred embodiment of the present invention, the hard particles are dispersed and present in the interior of respective grains of copper alloy powder forming the matrix. In another embodiment, the matrix of the sintered copper alloy comprises copper alloy powder grains containing dispersed hard particles, and copper alloy powder grains containing no hard particles.

Preferably, the iron material forming the brake shoe has a tensile strength of at least 400 MPa. The sintered copper alloy forming the ring has a transverse rupture strength of at least 200 MPa.

Preferably, the friction coefficient between the ring and the brake shoe is at least 0.15 and not more than 0.5 when braking the two-wheeler under a dry sliding environment without an additional solid and/or semisolid lubricant.

The sintered copper alloy forming the ring preferably contains 10 to 50 percent by weight of hard particles. The sintered copper alloy contains 5 to 15 percent by weight of a solid lubricating component. In one embodiment, a copper alloy forming the matrix contains 3 to 20 percent by weight of Sn assuming that the composition of the overall matrix is 100 percent by weight, with the rest consisting of copper and unavoidable impurities. The hard particles are typically those of at least one or two iron intermetallic compounds selected from a group consisting of FeMo, FeCr, FeTi, FeAl, FeSi and FeB. The solid lubricating component is preferably natural graphite powder. Preferably, the hard particles are not more than 30 $\mu$m in maximum particle diameter, and not more than 15 $\mu$m in mean particle diameter.

In another embodiment, the copper alloy forming the matrix contains 3 to 20 percent by weight of Sn and not more than 3 percent by weight of Al assuming that the composition of the overall matrix is 100 percent by weight, with the rest consisting of copper and unavoidable impurities. In still another embodiment, the copper alloy forming the matrix contains 5 to 40 percent by weight of Zn and/or Ni and 3 to 20 percent by weight of Sn assuming that the composition of the overall matrix is 100 percent by weight, with the rest consisting of copper and unavoidable impurities. In a further embodiment, the copper alloy forming the matrix contains 5 to 40 percent by weight of Zn and/or Ni, 3 to 20 percent by weight of Sn and not more than 3 percent by weight of Al assuming that the composition of the overall matrix is 100 percent, with the rest consisting of copper and unavoidable impurities.

In a preferred embodiment, the guide case is made of a material selected from a group consisting of an iron-based alloy, an aluminum alloy, a magnesium alloy, a copper alloy and a titanium alloy. In one embodiment, the ring has a convex part on its outer peripheral surface, and the guide case has a concave part for engaging with the convex part in its inner peripheral surface. The ring is press-fitted into the guide case and fixed thereto.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
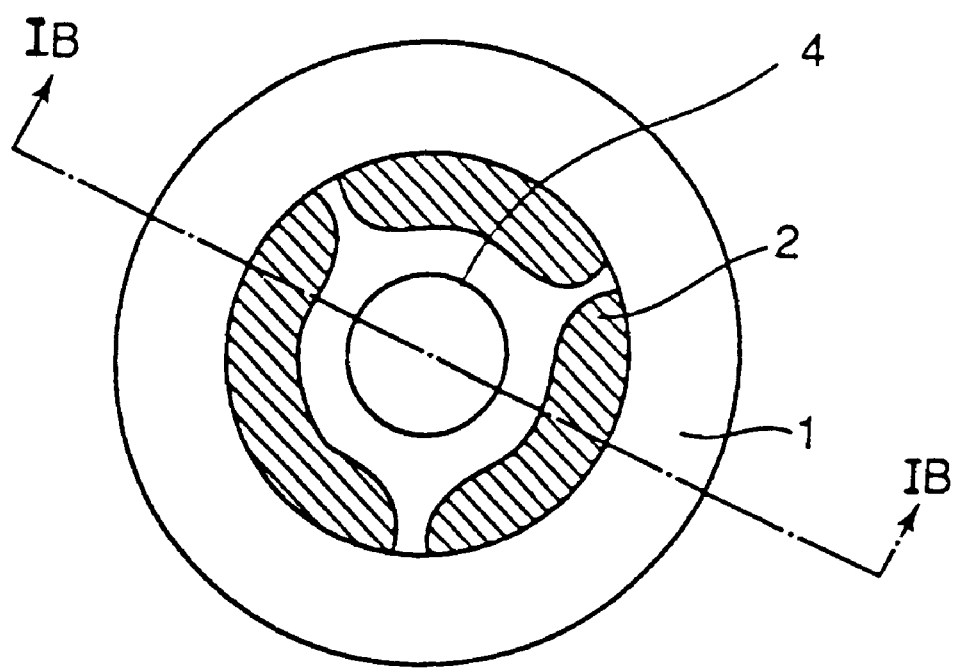
FIG. 1A is a plan view showing a conventional roller brake for a two-wheeler.
Figure 1B:
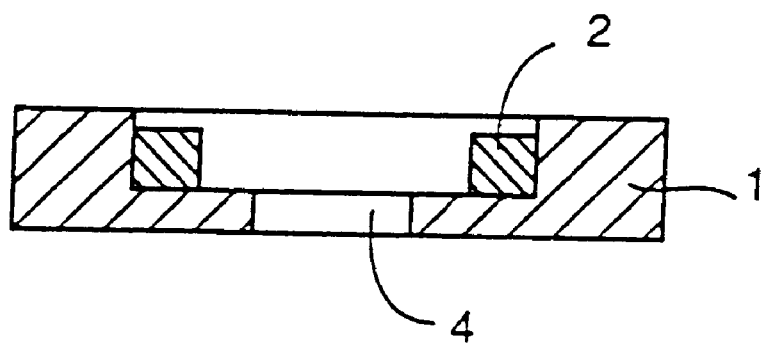
FIG. 1B is a sectional view taken along the line IB—IB in FIG. 1A.
Figure 2A:
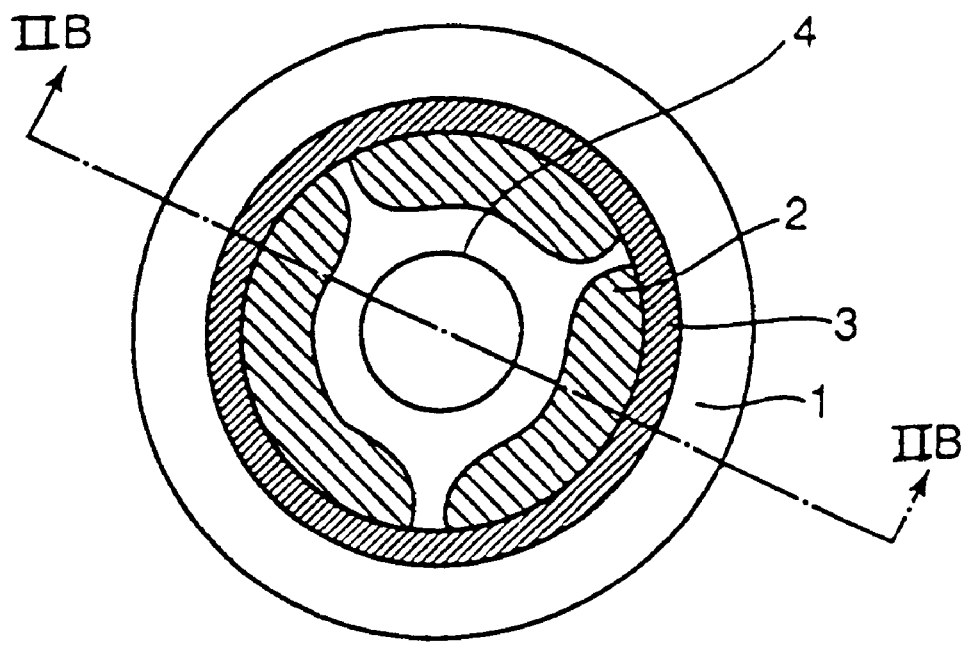
FIG. 2A is a plan view showing a roller brake for a two-wheeler according to an embodiment of the present invention.
Figure 2B:
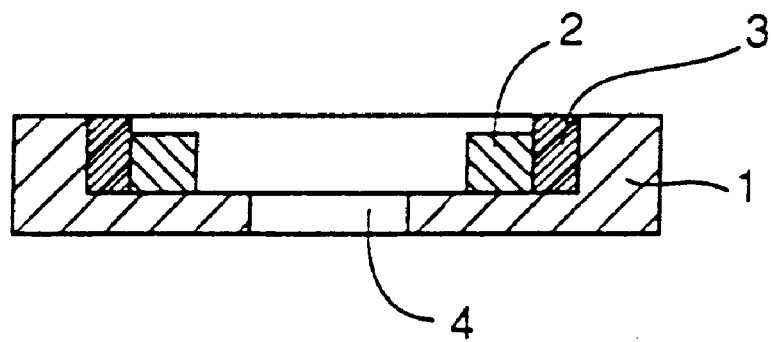
FIG. 2B is a sectional view taken along the line IIB—IIB in FIG. 2A.

Referring to FIGS. 2A and 2B, a roller brake for a two-wheeler according to the present invention comprises a guide case 1, a brake shoe 2, and a ring 3. The guide case 1 having an opening 4 in its center is fixed to a wheel of a two-wheeler, and rotates with this wheel. The ring 3 is prepared from a sintered copper alloy, and fixedly fitted into the guide case 1. The brake shoe 2 is prepared from an iron material, and has an outer peripheral surface which is substantially identical in radius of curvature to the inner peripheral surface of the ring 3. The outer peripheral surface of the brake shoe 2 is pressed against the inner peripheral surface of the ring 3, thereby exhibiting a braking effect.

Figure 3:
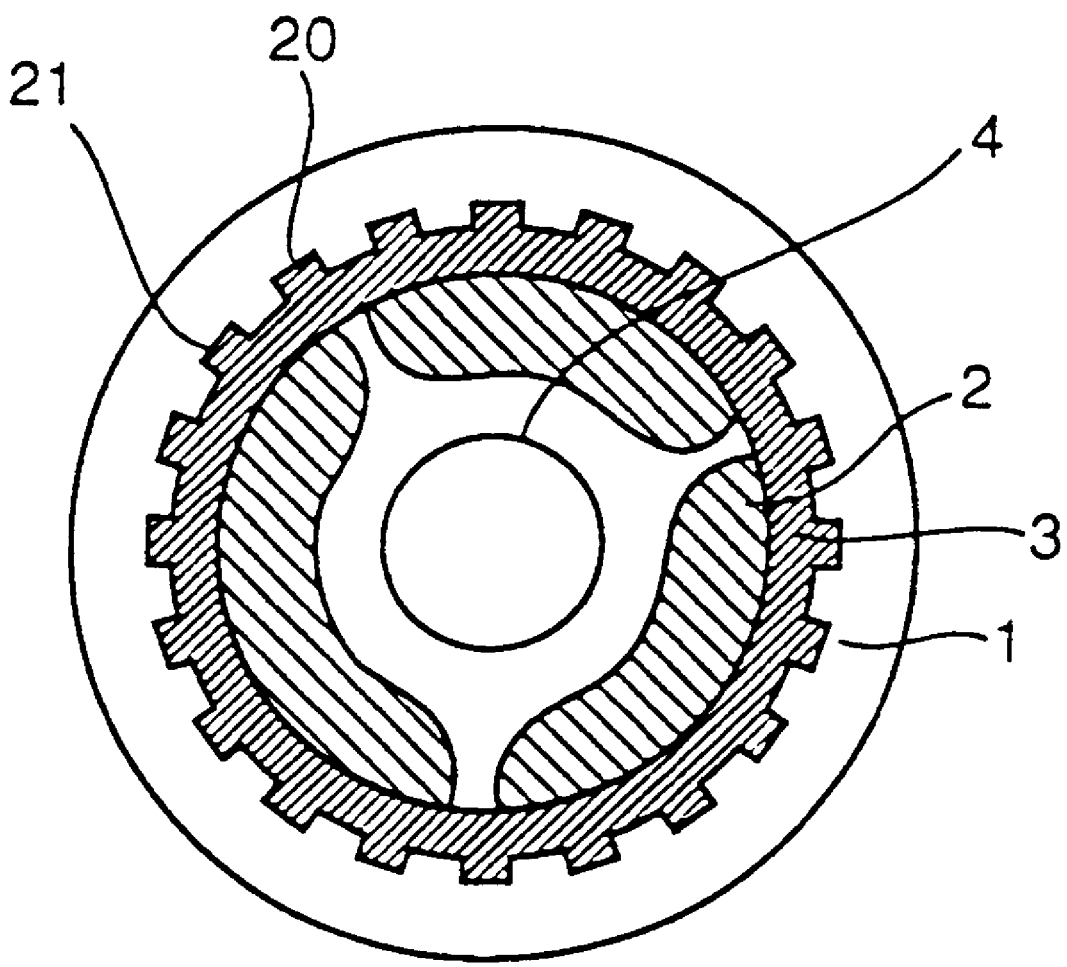
FIG. 3 is a plan view showing a roller brake for a two-wheeler according to another embodiment of the present invention.

The ring 3 is press-fitted into the guide case 1, and tightly fixed thereto. In order to sufficiently fix the ring 3, convex parts 20 and concave parts 21 may be provided on the outer peripheral surface of the ring 3 and the inner peripheral surface of the guide case 1 respectively for engaging with each other, as shown in FIG. 3.

The characteristics of the roller brake for a two-wheeler according to the present invention are now described in detail in relation to the brake shoe, the ring and the guide case respectively.

(Brake Shoe)

When a general bicycle is braked with a brake lever, a load of about 10 to 50 kgf/cm$^2$ is applied to the brake shoe. This load is applied for about several seconds under dry conditions. The brake shoe must not be deformed or abrasively damaged under such pressurization or application of a braking load.

The inventors have made various experiments, to discover that the material forming the brake shoe must have a tensile strength of at least 400 MPa in order to prevent the brake shoe from deformation or abrasive damage, and that the brake shoe for a racing two-wheeler may have tensile a strength of 1000 MPa.

If the tensile strength of the material for the brake shoe is less than 400 MPa, the brake shoe is easily abrasively damaged, or deformed by a pressing load during braking, which causes it to be locally in nonuniform contact with the counter ring. This may consequently lead to a problem of seizing. Therefore, a material having a tensile strength of at least 400 MPa is suitable for the brake shoe. Further, it is desired that the material is at has a low cost. From this point of view, an iron material is desirable as the material for the brake shoe.

While the iron material may be prepared from either an ingot steel material or a sintered alloy, the sintered alloy allowing near net shape or net shape compacting is economically advantageous, since the machining cost can be reduced.

A ring of a sintered copper alloy described later and a brake shoe of an iron material slide with high pressing force relative to each other, thereby exhibiting a high friction coefficient. In order to attain uniform contact between the ring and the brake shoe, the inner peripheral surface of the ring and the outer peripheral surface of the brake shoe must be substantially identical in radius of curvature to each other. If the radii of curvature are different from each other, the outer peripheral surface of the brake shoe comes into nonuniform contact with the inner peripheral surface of the ring, and it is difficult to ensure a stable high friction coefficient.

(Ring)

According to the present invention, a copper alloy is selected as the base material for the ring, in consideration of seizing resistance (adhesion resistance) with respect to the brake shoe consisting of an iron material. In consideration of economy, further, selected a powder metallurgy method (sintering method) is selected, which can readily simplify or omit a machining step and easily provide a three-dimensional shape.

Figure 4:
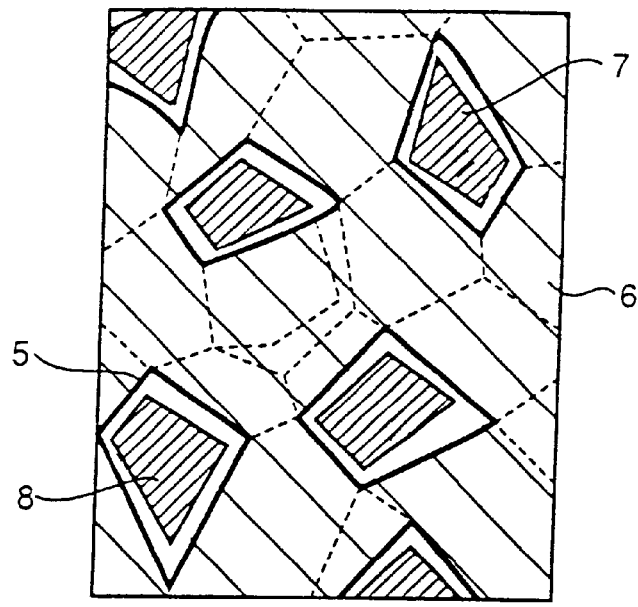
FIG. 4 is a model diagram showing an exemplary structural configuration of a sintered copper alloy.

In order to improve the abrasion resistance of the ring, hard particles are preferably dispersed in a matrix of the copper alloy. If the hard particles and copper alloy powder are merely mixed with each other and the mixed powder is thereafter solidified by compacting and sintering in this case, this results in a structural configuration shown in FIG. 4. Referring to FIG. 4, old powder grain boundaries 5 are present in a matrix 6 of the copper alloy, and hard particles 7 are located along the old powder grain boundaries 5. The hard particles 7 may aggregate or segregate, depending on the method of or the conditions for the mixing. In the sintered alloy having such a structural configuration, the adhesiveness between the hard particles 7 and the copper alloy matrix 6 is so inferior that clearances 8 may be defined therebetween. In this case, the hard particles 7 drop from the surface of the ring during frictional sliding, and consequently serve as an abrasive powder attacking the ring itself or the brake shoe and inducing abrasive damage. If the hard particles 7 are present on the old powder grain boundaries 5 when stress is applied, the positions thereof may serve as starting points or propagation paths of cracks, to remarkably reduce the mechanical characteristics of the sintered body.

Figure 5:
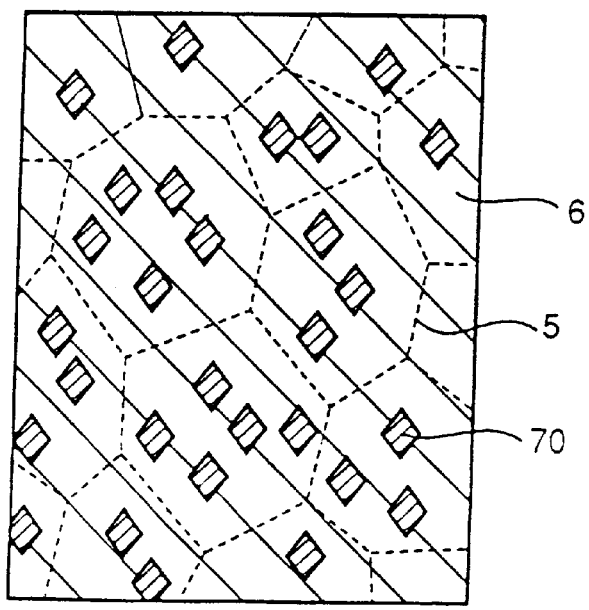
FIG. 5 is a model diagram showing another exemplary structural configuration of a sintered copper alloy.

From the aforementioned point of view, the inventors have discovered that a structural configuration shown in FIG. 5 is preferable. Referring to FIG. 5, fine hard particles 70 are dispersed and present in the interior of respective grains, enclosed with old powder grain boundaries 5, of copper alloy powder forming a matrix 6. In more concrete terms, the fine hard particles 70 are previously dispersed in the interior of copper alloy powder grains that have not yet been compacted or sintered. In other words, a so-called hard particle dispersed composite copper alloy powder is employed as a raw material powder. Consequently, it is possible to prepare a ring of a sintered copper alloy which is excellent in seizing resistance and abrasion resistance, and can exhibit a stable friction coefficient over a long period of time.

Figure 6:
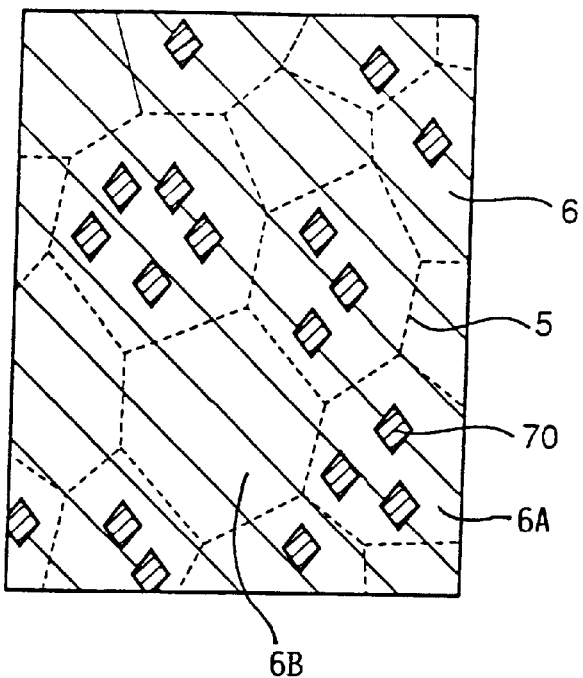
FIG. 6 is a model diagram showing still another exemplary structural configuration of a sintered copper alloy.

The hard particle dispersed composite copper alloy powder has a higher cost than copper alloy powder containing no hard particles. In order to suppress such increase of the cost, the raw material powder may be prepared from a mixed powder of hard particle dispersed composite copper alloy powder and copper alloy powder containing no hard particles. When the raw material powder is prepared from such a mixed powder, a structural configuration shown in FIG. 6 is obtained. Referring to FIG. 6, a matrix 6 of a sintered copper alloy comprises copper alloy powder grains 6A containing dispersed hard particles 70, and copper alloy powder grains 6B containing no hard particles.

(Hard Particle Dispersed Composite Copper Alloy Powder and Method of Preparing the Same)

The hard particles contained in the sintered copper alloy forming the ring are finely and homogeneously dispersed in a sliding surface, for suppressing adhesion to the brake shoe and improving seizing resistance in frictional sliding under ordinary and high temperatures. Further, the hard particles are directly in contact with the surface of the brake shoe to cause frictional resistance, whereby the friction coefficient is improved.

A necessary condition for attaining the aforementioned effects is that the hard particles do not drop out of the matrix of the sliding surface of the sintered material during frictional sliding. In order to implement this, the hard particle dispersed composite copper alloy powder is employed as a starting raw material. As a method of economically preparing the hard particle dispersed composite copper alloy powder, it is effective to use the following mechanical mixing/crushing method for powder.

When a mechanical mixing/crushing/alloying method for powder such as mechanical alloying, mechanical grinding or granulation is applied, an intermetallic compound or metal particles forming the hard particles can be finely crushed and the obtained fine hard particles can be homogeneously dispersed in the matrix of the grains of the copper alloy powder. The mechanical powder mixing/crushing/alloying treatment is carried out not in a wet type condition but in a dry type condition, dissimilarly to conventional ball mill crushing or mixing. A small amount of stearic acid or alcohol may be added as a PCA (process control agent) as needed, for preventing excessive aggregation. An attriter or a ball mill is suitable as the treatment apparatus. The attriter having excellent crushing efficiency is suitable for high-speed treatment. Although long-term treatment is necessary, the ball mill is economically excellent since the atmosphere can be readily controlled and a target structural configuration of the powder can be implemented in a relatively short time when the applied energy is properly set.

As another method of preparing hard particle dispersed composite copper alloy powder, copper alloy powder containing hard particles dispersed in its interior may be prepared by introducing hard particles into a molten metal of a copper alloy having a prescribed composition, stirring and dispersing the same, and spraying the molten metal by atomizing. In this method, however, the hard particles cannot be finely crushed, and hence fine hard particles must be previously prepared, to be introduced into the molten metal. In this case, a sufficient stirring step is required for preventing the hard particles from segregation and aggregation in the molten metal, and hence this method is slightly disadvantageous in view of economy. In order to prepare a sintered copper alloy containing hard particles dispersed in its grains at a lower cost, therefore, the mechanical mixing/crushing/alloying treatment is preferable.

The sizes of the hard particles and the content thereof are now described. The inventors have carried out mechanical mixing/crushing/alloying treatment on copper alloy powder having a prescribed composition under various conditions. Consequently, they have found that the sizes and the content of the hard particles dispersed in the matrix of the copper alloy powder are desirably within the following proper ranges, in order to obtain a sintered copper alloy for the ring which can stably ensure the target friction coefficient of 0.15 to 0.5:

In order to ensure a stable friction coefficient without reducing the mechanical characteristics of the ring of the sintered copper alloy, it is desirable to set the sizes of the hard particles in the range of not more than 30 $\mu$m in maximum particle diameter and not more than 15 $\mu$m in mean particle diameter while setting the content of the hard particles in the range of 10 to 50 percent by weight with respect to the overall sintered copper alloy, and to disperse the hard particles in the interior of powder grains forming the matrix.

If the content of the hard particles is less than 10 percent by weight, a friction coefficient exceeding 0.1 cannot be attained, and an effect of improving abrasion resistance cannot be attained either. If the hard particles are in excess of 30 $\mu$m in maximum particle diameter, in excess of 15 $\mu$m in mean particle diameter, or in excess of 50 percent by weight in content, the hard particles readily define starting points of cracks, to remarkably reduce the strength and toughness of the sintered copper alloy as the result. If the hard particles are added in an excess amount or have excessively large particle diameters, such hard particles remarkably abrade the counter material. Therefore, it is effective to homogeneously disperse hard particles of not more than 30 $\mu$m in maximum particle diameter and not more than 15 $\mu$m in mean particle diameter in the interior of powder grains forming the matrix with a content of 10 to 50 percent by weight of these hard particles.

The hard particles are preferably particles of at least one or two iron intermetallic compounds selected from a group consisting of FeMo, FeCr, FeTi, FeAl, FeSi and FeB. These iron intermetallic compounds having high hardness are suitable for the hard particles. In addition, these intermetallic compounds which are fragile are excellent in crushability, and are crushed during the mechanical mixing/crushing/alloying treatment into fine hard particles. While the friction coefficient of the sintered alloy can be improved if a metal oxide such as $Al_2O_3$, $SiO_2$ or $ZrO_2$ or ceramics such as SiC, TiC, AlN or $Si_3N_4$ is contained in the alloy, particles of such a material are inferior in cuttability to the iron intermetallic compounds, and hence a small problem may result in view economy.

The alloy composition of the matrix of the sintered copper alloy forming the ring is now described. The content of each element is expressed in weight percentage, assuming that the composition of the overall alloy matrix is 100 percent by weight.

Sn

Sn forms the matrix of the alloy with Cu, and improves high-temperature strength and toughness of the alloy. Sn also improves seizing resistance of the alloy with respect to the counter material under a high temperature. If the frictional sliding conditions are heavier, therefore, addition of Sn is effective. The aforementioned effects cannot be attained if the content of Sn is less than 3 percent by weight, while the strength and toughness of the alloy are reduced due to deposition of a hard and fragile layer if the Sn content exceeds 20 percent by weight. A proper Sn content which can attain the aforementioned effects is 3 to 20 percent by weight.

Zn and/or Ni

Both Zn and Ni form the matrix with Cu, and improve heat resistance as well as corrosion resistance of the alloy. In a braking device for a two-wheeler, the surface of a brake material is instantaneously heated to a high temperature by frictional heat, and hence the brake material is readily softened to be abraded or deformed. In a part which is directly in contact with rainwater or seawater, a problem such as abrasive damage or reduction of endurance results from corrosion. Such problems can be avoided by addition of Zn and/or Ni. A proper content of at least one of or both Zn and Ni is 5 to 40 percent by weight. If the content is less than 5 percent by weight, the effect of improving heat resistance and corrosion resistance cannot be sufficiently attained. If the content exceeds 40 percent by weight, on the other hand, the matrix of the copper alloy is hardened to disadvantageously attack the counter material during frictional sliding.

Al

Al reacts with Cu of the matrix to form a fine intermetallic compound such as $Cu_6Al_4$ thereby improving hardness of the alloy, and serves as resistive particles during frictional sliding thereby improving the friction coefficient. If added in excess of 3 percent by weight, however, Al induces embrittlement of the alloy and reduces machinability and cold workability. Therefore, a proper content of Al added to the sintered copper alloy according to the present invention as needed is not more than 3 percent by weight.

The characteristics and the content of graphite powder serving as a solid lubricant are now described.

The solid lubricant improves the attacking property and seizing resistance of the ring against the brake shoe, i.e. the respective counter material, under heavy frictional sliding conditions. Also when the frictional sliding conditions such as a sliding rate and pressing force fluctuate, the solid lubricant effectively stabilizes the friction coefficient of 0.1 to 0.5 under dry sliding conditions. Further, the solid lubricant improves lubricity between the sliding surfaces, thereby effectively suppressing vibration or chattering in sliding. In more concrete terms, graphite powder, $MoS_2$, $CaF_2$, $WS_2$ or BN powder is industrially employed as the solid lubricant. Particularly in case of adding the solid lubricant in a large amount, graphite powder is generally selected in consideration of economy.

The inventors have tried to apply natural scaly graphite powder (hereinafter simply referred to as natural graphite powder) having superior characteristics to spherical graphite powder which has been employed for conventional powder metallurgy, or expanded graphite powder prepared by expanding the natural graphite powder in the direction of thickness, among graphite powder materials. The natural graphite powder is (i) superior in compactability and compressibility, and (ii) superior in lubricity to the conventional spherical graphite powder. Namely, the natural graphite powder, which is superior in compactability to the conventional spherical graphite powder, can be added in a larger amount, thereby further stabilizing the friction coefficient. In addition, the natural graphite powder can suppress reduction of the mechanical characteristics (strength) of the sintered body.

A preferable content of the solid lubricating component is 5 to 15 percent by weight with respect to the overall sintered copper alloy. If natural graphite powder or expanded graphite powder is added in excess of 15 percent by weight with respect to the overall sintered copper alloy, the transverse rupture strength of the sintered body falls below 200 MPa, to induce abrasive damage. The natural graphite powder having superior lubricity can suppress problems such as chattering, vibration or squeaking during sliding, and can further stabilize the friction coefficient by improving fitness with respect to the counter material in an initial stage of sliding. If the content of the graphite powder is less than 5 percent by weight with respect to the overall sintered alloy, however, it is difficult to attain the aforementioned excellent sliding characteristics. Thus, the desirable content of the natural graphite powder or the expanded graphite powder added to the sintered copper alloy is at least 5 percent by weight and not more than 15 percent.

When the aforementioned graphite powder is dispersed in a sintered body, compressibility of the sintered body itself is improved during pressurization or application of a pressing force due to the excellent compressibility of the graphite powder, whereby merely local nonuniform contact with the sliding surface of the counter material can be suppressed, total contact is enabled and frictional slidability can be stabilized. Thus, a sintered body obtained by mixing hard particle dispersed composite copper alloy powder and natural graphite powder (natural scaly graphite powder and/or expanded graphite powder) with each other and solidifying the mixture has excellent mechanical characteristics and frictional slidability, and can exhibit a stable friction coefficient from an initial stage of sliding in particular.

(Method of Preparing Ring)

As already described with reference to FIGS. 2A and 2B, the inventive roller brake for a two-wheeler comprises the guide case 1, the ring 3 consisting of a sintered copper alloy which is press-fitted into this guide case 1, and the brake shoe 2 consisting of an iron material which is pressed against the ring 3.

The ring 3 must have excellent mechanical characteristics (strength), not to be deformed or abraded when the brake shoe 2 is pressed against the same for braking the two-wheeler. In more concrete terms, a transverse rupture strength of at least 200 MPa is necessary as the material strength required for the ring 3, if the pressing force from the brake shoe 2 is 10 to 50 $kgf/cm^2$. Needless to say, a higher transverse rupture strength is required for the ring 3 if the pressing force exceeds 50 $kgf/cm^2$.

Figure 7:
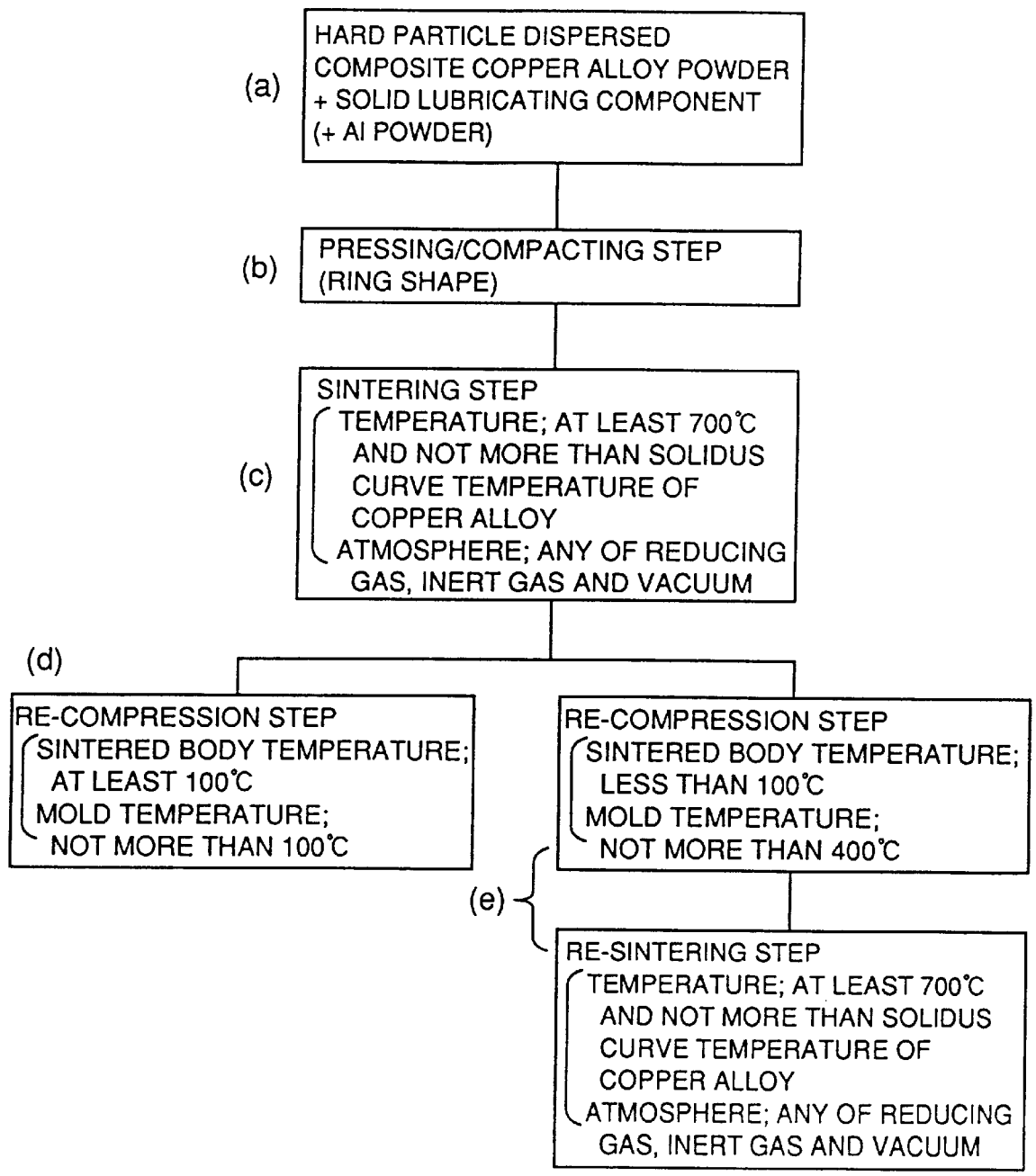
FIG. 7 illustrates steps of preparing a ring of a sintered copper alloy.

FIG. 7 successively illustrates steps of preparing the ring of a sintered copper alloy. The respective steps are now described.

Step (a)

Mixed powder is prepared by adding a solid lubricating component to hard particle dispersed composite copper alloy powder having the aforementioned prescribed alloy composition, and adding Al thereto if necessary.

Step (b)

The mixed powder is pressed/compacted, thereby forming a ring-shaped green compact.

Step (c)

The green compact is held at a temperature of at least 700° C. and not more than the solidus curve temperature of the alloy matrix, and heated/held in an atmosphere of any of a reducing gas, inert gas an and a vacuum, thereby preparing a sintered body. In order to prepare a sintered copper alloy having a transverse rupture strength of at least 200 MPa, either of the following two steps is preferably applied:

Step (d)

The sintered body is heated to and held at a temperature of at least 100° C. and re-compressed under a closed mold temperature of not more than 400° C.

Step (e)

The sintered body is heated to and held at a temperature of less than 100° C. and re-compressed under a closed mold temperature of not more than 400° C., and re-sintered at a temperature of at least 700° C. and not more than the solidus curve temperature of the copper alloy in an atmosphere of any of a reducing gas, an inert gas and a vacuum.

According to the aforementioned step (d), the sintered body is heated to and held at a temperature of at least 100° C. and pressurized in a closed mold, whereby old powder materials strongly bond to each other and transverse rupture strength of at least 200 MPa can be a attained. In this case, the mold, which may be under the ordinary temperature, is preferably held at a high temperature of not more than 400° C., and more preferably held at a temperature of not more than 200° C. If the mold is at a high temperature, temperature reduction of the heated sintered body is suppressed and the old powder materials further strongly bond to each other. With regard to selection of a lubricant for preventing seizing of the mold and the sintered body in pressurization, however, a black lubricant such as that of graphite or molybdenum is required if the mold temperature exceeds 200° C., leading to a possibility of damaging the appearance of the pressed sintered body. If the mold temperature is less than 200° C., on the other hand, a white or transparent and colorless lubricant prepared by dissolving metallic soap powder such as zinc stearate or lithium stearate, for example, in an organic solvent such as myristic acid or ethanol can be applied, so as not to damage the appearance of the sintered body dissimilarly to the above described case in which a black lubricant must be used. The characteristics of the re-compressed sintered body are not remarkably further improved even if the sintered body is heated/held under a higher mold temperature exceeding 400° C., and hence the mold temperature does not need to be more than 400° C., in consideration of economy.

If the sintered body is heated to and held at a temperature less than 100° C. and pressed in the closed mold in the step (e), on the other hand, the aforementioned re-sintering step is necessary in succession, and a sintered copper alloy having a transverse rupture strength of at least 200 MPa can be obtained as a result. However, it is recognized that the characteristics of the sintered body are further improved if the sintered body heated in the step (d) is pressurized in the closed mold and thereafter subjected to the aforementioned re-sintering step in succession.

If the sintering atmosphere is an oxidizing atmosphere or the holding temperature is less than 700° C. in the aforementioned method, the sintered body cannot attain sufficient strength due to insufficient progress of the sintering phenomenon, leading to poor handleability such that the sintered body may easily be broken during transport thereof.

If the sintered body is heated to a temperature exceeding the solidus curve temperature of the alloy matrix, on the other hand, the amount of dimensional shrinkage of the green compact is so increased as to reduce dimensional accuracy in sintering.

If the heated sintered body is pressurized in the closed mold or in a state heated in excess of 100° C. in the subsequent step for further improving the strength of the obtained sintered body, bonding between the old powder materials of the sintered body is facilitated and a sintered body having a transverse rupture strength of at least 200 MPa can be prepared. When the sintered body is heated to a temperature less than 100° C. and pressurized as described in the step (e), however, it is difficult to attain a transverse rupture strength of at least 200 MPa, and hence the aforementioned re-sintering step is necessary for improving the bondability between the old powder materials. If the sintering temperature exceeds that in the first time, the sintering phenomenon further progresses to increase the amount of dimensional shrinkage of the sintered body, leading to reduction in dimensional accuracy of the ring sintered body.

Summarizing the above, copper alloy powder consisting of a prescribed composition and hard particles are mechanically mixed/crushed/alloyed so that the hard particles are finely crushed to not more than 30 $\mu$m in maximum particle diameter and not more than 15 $\mu$m in mean particle diameter and can be finely dispersed in copper alloy powder grains (in the matrix of the powder). Thus, hard particle dispersed composite copper alloy powder is obtained. Natural scaly graphite powder or expanded graphite powder is added to such copper alloy powder to form a mixed powder, the mixed powder is compacted/sintered, and further subjected to plastic working by pressurization/solidification in the closed mold, followed by a sintering step as needed. Thus, it is possible to prepare a sintered copper alloy ring exhibiting sufficient mechanical characteristics for serving as a brake ring member as well as excellent abrasion resistance and seizing resistance under dry sliding conditions, with the target friction coefficient of 0.15 to 0.5.

(Guide Case)

The sintered copper alloy ring prepared in the aforementioned manner is press-fitted into the inner periphery of the guide case as shown in FIG. 2A, thereby preparing a roller brake body of a two-layer structure. The guide case is generally prepared from an industrial metal material such as an iron-based alloy, an aluminum alloy, a magnesium alloy or a copper alloy, in consideration of mechanical characteristics (particularly the strength of spline teeth parts at the central portion of the guide case engaging with the wheel) and economy. Particularly when a high pressing load is applied between the ring and the brake shoe, high frictional heat generated between the same must be dissipated. Therefore, an aluminum alloy having high heat conductivity and excellent heat dissipation with a remarkable effect of weight reduction is suitable as the material for the guide case.

EXAMPLE 1

Table 1 shows alloy compositions of inventive sintered copper alloy samples Nos. 1 to 21 and comparative samples (Nos. 22 to 36).

TABLE 1

| | Composition of Matrix | | | | | | Solid Lubricating Component | | | Hard Particles (Iron Intermetallic Compound) | | | | | | |
|---|---|---|---|---|---|---|---|---|---|---|---|---|---|---|---|---|
| No. | Sn | Zn | Ni | (Zn + Ni) | Al | Cu | A | B | Total | C | D | E | F | G | Total | Remarks |
| 1 | 9 | 0 | 0 | 0 | 1 | Rest | 5 | 0 | 5 | 20 | 0 | 0 | 0 | 0 | 20 | |
| 2 | 9 | 0 | 0 | 0 | 1 | Rest | 6 | 0 | 6 | 20 | 0 | 0 | 0 | 0 | 20 | |
| 3 | 9 | 0 | 0 | 0 | 0 | Rest | 10 | 0 | 10 | 20 | 0 | 0 | 0 | 0 | 20 | |
| 4 | 9 | 0 | 0 | 0 | 1 | Rest | 15 | 0 | 15 | 20 | 0 | 0 | 0 | 0 | 20 | |
| 5 | 9 | 0 | 0 | 0 | 0 | Rest | 0 | 8 | 8 | 20 | 0 | 0 | 0 | 0 | 20 | |
| 6 | 9 | 0 | 0 | 0 | 0 | Rest | 0 | 12 | 12 | 20 | 0 | 0 | 0 | 0 | 20 | |
| 7 | 9 | 0 | 0 | 0 | 0 | Rest | 7 | 0 | 7 | 0 | 0 | 0 | 0 | 20 | 20 | |
| 8 | 10 | 0 | 0 | 0 | 2 | Rest | 7 | 0 | 7 | 0 | 20 | 0 | 0 | 0 | 20 | |
| 9 | 9 | 0 | 0 | 0 | 0 | Rest | 7 | 0 | 7 | 0 | 0 | 20 | 0 | 0 | 20 | |
| 10 | 11 | 0 | 0 | 0 | 0 | Rest | 7 | 0 | 7 | 0 | 0 | 0 | 20 | 0 | 20 | |
| 11 | 9 | 0 | 0 | 0 | 0 | Rest | 7 | 0 | 7 | 0 | 0 | 0 | 0 | 20 | 20 | |
| 12 | 9 | 0 | 0 | 0 | 1 | Rest | 7 | 0 | 7 | 10 | 0 | 0 | 0 | 0 | 20 | |
| 13 | 10 | 0 | 0 | 0 | 0 | Rest | 7 | 0 | 7 | 10 | 10 | 0 | 10 | 0 | 20 | |
| 14 | 10 | 0 | 0 | 0 | 0 | Rest | 7 | 0 | 7 | 12 | 0 | 0 | 0 | 0 | 12 | |
| 15 | 9 | 0 | 0 | 0 | 0 | Rest | 7 | 0 | 7 | 35 | 0 | 0 | 0 | 0 | 35 | |
| 16 | 10 | 0 | 0 | 0 | 0 | Rest | 7 | 0 | 7 | 0 | 0 | 0 | 0 | 0 | 40 | |
| 17 | 9 | 5 | 0 | 0 | 1 | Rest | 6 | 0 | 6 | 20 | 40 | 0 | 0 | 0 | 20 | |
| 18 | 9 | 10 | 0 | (10) | 0 | Rest | 6 | 0 | 6 | 20 | 0 | 0 | 0 | 0 | 20 | |
| 19 | 9 | 0 | 15 | (15) | 0 | Rest | 6 | 0 | 6 | 20 | 0 | 0 | 0 | 0 | 20 | |
| 20 | 11 | 10 | 5 | (15) | 0 | Rest | 6 | 0 | 6 | 20 | 0 | 0 | 0 | 0 | 20 | |
| 21 | 15 | 0 | 0 | 0 | 1 | Rest | 7 | 0 | 7 | 20 | 0 | 0 | 0 | 0 | 20 | |
| 22 | 0 | 0 | 0 | 0 | 0 | Rest | 7 | 0 | 7 | 20 | 0 | 0 | 0 | 0 | 20 | |
| 23 | 2 | 0 | 0 | 0 | 0 | Rest | 7 | 0 | 7 | 20 | 0 | 0 | 0 | 0 | 20 | |
| 24 | 25 | 0 | 0 | 0 | 0 | Rest | 7 | 0 | 7 | 20 | 0 | 0 | 0 | 0 | 20 | |
| 25 | 9 | 0 | 0 | 0 | 0 | Rest | 0 | 0 | 0 | 20 | 0 | 0 | 0 | 0 | 20 | |
| 26 | 9 | 0 | 0 | 0 | 0 | Rest | 3 | 0 | 3 | 20 | 0 | 0 | 0 | 0 | 20 | |
| 27 | 9 | 0 | 0 | 0 | 0 | Rest | 0 | 2 | 2 | 20 | 0 | 0 | 0 | 0 | 20 | |
| 28 | 9 | 0 | 0 | 0 | 0 | Rest | 18 | 0 | 18 | 20 | 0 | 0 | 0 | 0 | 20 | |
| 29 | 9 | 0 | 0 | 0 | 0 | Rest | 6 | 0 | 6 | 5 | 0 | 0 | 0 | 0 | 5 | |
| 30 | 9 | 0 | 0 | 0 | 0 | Rest | 6 | 0 | 6 | 55 | 0 | 0 | 0 | 0 | 55 | |
| 31 | 9 | 45 | 0 | (45) | 0 | Rest | 6 | 0 | 6 | 20 | 0 | 0 | 0 | 0 | 20 | |
| 32 | 9 | 0 | 45 | (45) | 0 | Rest | 6 | 0 | 6 | 20 | 0 | 0 | 0 | 0 | 20 | |
| 33 | 9 | 0 | 0 | 0 | 5 | Rest | 6 | 0 | 6 | 20 | 0 | 0 | 0 | 0 | 20 | |
| 34 | 9 | 0 | 0 | 0 | 0 | Rest | 7 | 0 | 7 | 20 | 0 | 0 | 0 | 0 | 20 | *1 |
| 35 | 10 | 0 | 0 | 0 | 0 | Rest | 6 | 0 | 6 | 20 | 0 | 0 | 0 | 0 | 20 | *2 |
| 36 | 10 | 0 | 0 | 0 | 0 | Rest | 7 | 0 | 7 | 20 | 0 | 0 | 0 | 0 | 20 | *3 |

Referring to Table 1, the contents of the hard particles (iron intermetallic compound(s)) and the solid lubricating component forming each sample are expressed in weight percentage with respect to the overall sintered copper alloy of 100 percent by weight. The contents of the respective elements forming the matrix of each sample are expressed in weight percentage with respect to the overall matrix of 100 percent by weight, with the rest consisting of copper (Cu). With reference to the solid lubricating components, symbol A denotes natural scaly graphite powder (40 μm in mean particle diameter), and symbol B denotes natural expanded graphite powder (150 μm in mean particle diameter). With reference to the iron intermetallic compounds forming the hard particles, symbols C to G denote the following compounds respectively:

C: FeMo

D: FeCr

E: FeAl

F: FeTi

G: FeSi

Except the comparative sample No. 36, each of the sintered copper alloys was obtained by mixing hard particle dispersed composite copper alloy powder with a prescribed amount of solid lubricating powder and then compacting and sintering the mixed powder, and exhibited a transverse rupture strength of at least 200 MPa. The hard particle dispersed composite copper alloy powder was obtained by mechanically alloying mixed a powder of copper alloy powder having a component composition for forming a matrix and hard particles.

Referring to Table 1, the comparative samples Nos. 34, 35 and 36 provided with numerals *1, *2 and *3 were obtained as follows:

Comparative Sample No. 34: Starting raw material powder was mechanically mixed and crushed while the treatment conditions therefor were changed so that the maximum particle diameter of the hard particles was 60 μm, and the mixed powder was compacted and sintered.

Comparative Sample No. 35: Starting raw material powder was mechanically mixed and crushed while the treatment conditions therefor were changed so that the maximum particle diameter of the hard particles was 60 μm, and the mixed powder was compacted and sintered.

Comparative Sample No. 36: Starting raw material powder was compacted and sintered without a mechanical mixing/crushing/alloying treatment.

Table 2 shows results of evaluation of maximum particle diameters, mean particle diameters, mechanical characteristics (transverse rupture strength) and frictional sliding characteristics (friction coefficients μ and abrasion loss of frictional and counter materials).

TABLE 2

| Sample No. | Hard Particles μm Maximum Particle Diameter | Hard Particles μm Mean Particle Diameter | Transverse Rupture Strength of Sintered Body | μ value | Friction Sliding Characteristics Abrasion Loss mg[1] Sintered Material | Friction Sliding Characteristics Abrasion Loss mg[1] Counter Material | State of Damage |
|---|---|---|---|---|---|---|---|
| 1 | 17 | 9 | 325 | 0.38 | 20 | 7 | no damage |
| 2 | 21 | 10 | 305 | 0.35 | 22 | 6 | no damage |
| 3 | 20 | 10 | 264 | 0.33 | 25 | 5 | no damage |
| 4 | 19 | 11 | 233 | 0.31 | 25 | 4 | no damage |
| 5 | 19 | 10 | 295 | 0.38 | 20 | 6 | no damage |
| 6 | 20 | 10 | 250 | 0.32 | 21 | 6 | no damage |
| 7 | 18 | 11 | 298 | 0.38 | 18 | 4 | no damage |
| 8 | 15 | 9 | 288 | 0.41 | 21 | 7 | no damage |
| 9 | 18 | 11 | 295 | 0.39 | 19 | 5 | no damage |
| 10 | 20 | 10 | 310 | 0.39 | 19 | 5 | no damage |
| 11 | 19 | 11 | 294 | 0.38 | 20 | 7 | no damage |
| 12 | 17 | 11 | 306 | 0.40 | 22 | 6 | no damage |
| 13 | 16 | 10 | 288 | 0.38 | 25 | 5 | no damage |
| 14 | 21 | 11 | 322 | 0.33 | 25 | 6 | no damage |
| 15 | 22 | 11 | 276 | 0.44 | 22 | 5 | no damage |
| 16 | 20 | 11 | 265 | 0.47 | 24 | 5 | no damage |
| 17 | 17 | 9 | 319 | 0.41 | 21 | 4 | no damage |
| 18 | 19 | 9 | 322 | 0.42 | 19 | 4 | no damage |
| 19 | 18 | 10 | 332 | 0.43 | 17 | 4 | no damage |
| 20 | 21 | 11 | 328 | 0.42 | 19 | 6 | no damage |
| 21 | 21 | 10 | 295 | 0.36 | 20 | 7 | no damage |
| 22 | 22 | 10 | 322 | 0.77 | $3 \times 10^3$ | $-3 \times 10^2$ | seizing |
| 23 | 24 | 11 | 312 | 0.75 | $1 \times 10^3$ | $-2 \times 10^2$ | seizing |
| 24 | 20 | 9 | 276 | 0.81 | $3 \times 10^3$ | $-3 \times 10^2$ | seizing |
| 25 | 24 | 11 | 402 | 0.78 | $3 \times 10^3$ | $-2 \times 10^2$ | seizing |
| 26 | 20 | 9 | 365 | 0.75 | $6 \times 10^3$ | $-3 \times 10^2$ | seizing |
| 27 | 19 | 8 | 388 | 0.76 | $7 \times 10^3$ | $-3 \times 10^2$ | seizing |
| 28 | 19 | 9 | 175 | 0.55 | $7 \times 10^3$ | 15 | abrasive damage |
| 29 | 20 | 10 | 325 | 0.73 | $2 \times 10^3$ | $-2 \times 10^2$ | seizing |
| 30 | 20 | 10 | 190 | 0.80 | $2 \times 10^3$ | $-2 \times 10^2$ | seizing |
| 31 | 20 | 10 | 286 | 0.77 | $2 \times 10^3$ | $-2 \times 10^2$ | seizing |
| 32 | 20 | 10 | 278 | 0.78 | $2 \times 10^3$ | $-2 \times 10^2$ | seizing |
| 33 | 20 | 10 | 195 | 0.77 | $2 \times 10^3$ | $-2 \times 10^2$ | seizing |
| 34 | 50 | 13 | 191 | 0.42 | 97 | 46 | no damage |
| 35 | 40 | 32 | 186 | 0.39 | 76 | 32 | no damage |
| 36 | 79 | 61 | 165 | 0.81 | $3 \times 10^3$ | $-3 \times 10^2$ | seizing |

Figure 8:
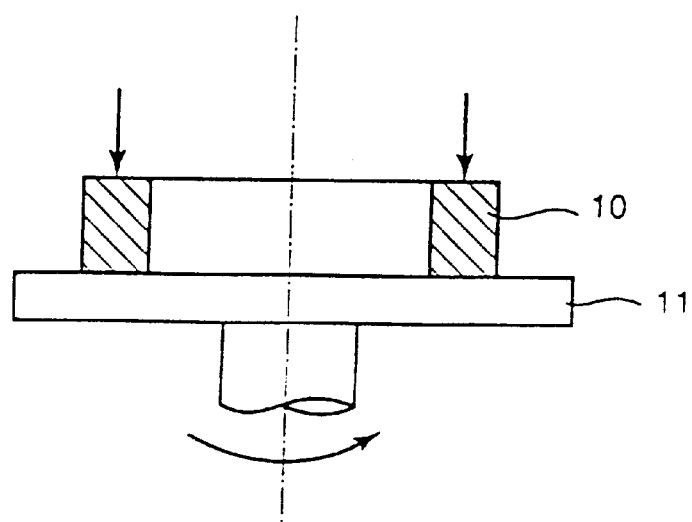
FIG. 8 is adapted to illustrate a ring-on-disc friction test method.

Referring to Table 2, the negative symbol "-" in the column of abrasion loss of the counter materials indicates an increase in weight resulting from adhesion. In a friction test, friction coefficients were measured with a ring-on-disc friction tester shown in FIG. 8 after continuous driving for 30 minutes in a dry atmosphere. The counter materials were prepared from iron sintered materials having tensile strength of 650 MPa. When the friction coefficients exceeded 0.7, seizing took place. Referring to FIG. 8, reference numeral 10 denotes a fixed sintered copper alloy ring, and reference numeral 11 denotes a rotating iron counter material. The test conditions were as follows:

Pressing Force: 30 kg/cm$^2$

Speed: 2 m/sec.

Friction Time: 30 min.

Testpiece Shape: fixed sintered copper alloy (ring of N60×N50×5 mm)

Counter Material: rotating iron material (discoidal sintered material of N80×5 mm with tensile strength of 650 MPa)

In correspondence to Table 1, Table 2 shows the results of the inventive samples Nos. 1 to 21 and the comparative samples Nos. 22 to 36.

The inventive samples Nos. 1 to 21, which were prepared from sintered copper alloys having desirable component compositions, exhibited transverse rupture strength values exceeding the target value of 200 MPa. Further, the inventive samples Nos. 1 to 21 exhibited friction coefficients ($\mu$) within the target range of 0.15 to 0.5 with no seizing to the counter materials or abrasive damage, and were recognized as sufficiently applicable to ring materials.

On the other hand, the comparative samples Nos. 22 to 36 caused the following problems:

Comparative Sample No. 22: The alloy containing no Sn was reduced in abrasion resistance, to finally cause seizing with the counter material.

Comparative Sample No. 23: The alloy was reduced in abrasion resistance and seizing resistance due to the small Sn content of 2%, to finally cause seizing with the counter material.

Comparative Sample No. 24: The matrix was extremely hardened and attacked the counter material due to the large Sn content of 25%, to finally cause seizing with the counter material.

Comparative Sample No. 25: The alloy containing no solid lubricating component caused seizing with the counter material.

Comparative Sample No. 26: The alloy caused seizing with the counter material due to the small content of 3% of the solid lubricating component.

Comparative Sample No. 27: The alloy caused seizing with the counter material due to the small content of 2% of the solid lubricating component.

Comparative Sample No. 28: The sintered body was reduced in strength due to the large content of 18% of the solid lubricating component.

Comparative Sample No. 29: A sufficient abrasion resistance was not attained due to the small content of 5% of the hard particles, and the alloy finally caused seizing with the counter material.

Comparative Sample No. 30: The sintered body was reduced in strength and attacked the counter material, due to the large content of 55% of the hard particles.

Comparative Sample No. 31: The matrix was extremely hardened and attacked the counter material due to the large Zn content of 45%, to finally cause seizing with the counter material.

brakes with no grease lubrication. These roller brakes were mounted on rear wheels of 24-inch bicycles, and an endurance test of 10000 cycles in total was made by pedaling the bicycles at a speed of 10 km/h., applying a lever input of 8 kgf (surface pressure by pressing force: about 30 kgf/cm$^2$) thereto, stopping the bicycles in five seconds and pedaling the same at a speed of 10 km/h. again every cycle. Friction coefficients $\mu$ in 100, 1000 and 10000 cycles were calculated from effectiveness factors (braking force), while states of damage of the brake shoes and the rings were investigated. Table 3 shows the results.

TABLE 3

| Sample No. | Type of Material for Break Shoe | Tensile Strength of Shoe MPa | Friction Coefficient $\mu$ in Endurance Test Cycle No. 100 | 1000 | 10000 | State of Damage |
|---|---|---|---|---|---|---|
| 1 | iron sintered material | 450 | 0.40 | 0.41 | 0.40 | no damage on shoe and ring |
| 2 | iron sintered material | 650 | 0.39 | 0.41 | 0.41 | no damage on shoe and ring |
| 3 | ingot steel material | 500 | 0.38 | 0.40 | 0.41 | no damage on shoe and ring |
| 4 | iron sintered material | 200 | 0.43 | seizing caused | seizing caused | shoe deformed to cause seizing |
| 5 | iron sintered material | 300 | 0.40 | 0.55 | seizing caused | shoe deformed to cause seizing |
| 6 | ingot steel material | 200 | 0.45 | seizing caused | test stopped | shoe deformed to cause seizing (locking) |
| 7 | ingot steel material | 300 | 0.42 | 0.54 | seizing caused | shoe deformed to cause seizing |
| 8 | iron sintered material | 450 | 0.52 | seizing caused | test stopped | shoe and ring caused seizing and locking |
| 9 | iron sintered material | 450 | 0.33 | 0.41 | seizing caused | ring attached shoe to cause seizing |
| 10 | iron sintered material | 350 | 0.09 | 0.10 | 0.09 | no damage on shoe and ring |

Comparative Sample No. 32: The matrix was extremely hardened and attacked the counter material due to the large Ni content of 45%, to finally cause seizing with the counter material.

Comparative Sample No. 33: The sintered body was extremely hardened, reduced in strength, and attacked the counter material due to the large Al content of 5%, to cause seizing.

Comparative Sample No. 34: The sintered body was reduced in strength due to the large maximum grain diameter of 50 $\mu$m of the hard particles.

Comparative Sample No. 35: The sintered body was reduced in strength due to the large maximum and mean particle diameters of 40 $\mu$m and 32 $\mu$m of the hard particles.

Comparative Sample No. 36: Respective powder materials having prescribed components were merely mixed with each other and thereafter sintered with no mechanical crushing/mixing, and hence no reaction layer was formed between the hard particles and the matrix. Due to presence of coarse hard particles, further, the hard particles dropped out of the matrix during sliding to cause seizing with the counter material, while the sintered material was reduced in strength.

EXAMPLE 2

The sintered copper alloy sample No. 2 according to Example 1 of the present invention was worked into rings of N60 mm in outer diameter and N50 mm in inner diameter, which in turn were press-fitted into guide cases of an aluminum alloy for preparing roller brake bodies of two-layer structures. On the other hand, iron materials having various tensile strength values shown in Table 3 were prepared and worked into brake shoes having outer peripheral surfaces which were identical in radius of curvature to the inner diameters of the rings, thereby preparing roller As understood from Table 3, neither nonuniform contact nor abrasive damage of the brake shoes and the rings was recognized in the 10000 cycle endurance test on the actual bicycles when the brake shoes were prepared from the iron material samples Nos. 1 to 3 according to Example 2 of the present invention having the radii of curvature to be uniformly in contact with the inner peripheral surfaces of the rings with a tensile strength of at least 400 MPa, and it was possible to confirm that the roller brakes stably exhibited a braking force corresponding to friction coefficients of about 0.4.

On the other hand, the brake shoes prepared from the iron material comparative samples Nos. 4 to 7 having a tensile strength of less than 400 MPa were deformed by the pressing force from the brake levers to be nonuniformly in contact with the rings, leading to seizing or locking (no rotation of wheels), with occurrence of remarkable abnormal sounds (squeaking).

Referring to Table 3, the samples Nos. 8 and 9 were prepared by employing an S35C steel material and an Al—SiC composite material (SiC particle dispersed aluminum alloy) for the rings respectively. Both these samples Nos. 8 and 9 were incapable of attaining the target friction coefficients and caused seizing or locking, and it was recognized that these materials are not applicable to rings.

On the other hand, the sample No. 10 was obtained by preparing both a ring serving also as a guide case and a brake shoe from an S35C steel material and filling up the clearance between the shoe and the ring with grease for lubrication, similarly to the prior art. In this case, the roller brake caused neither seizing, nor locking nor abnormal sound, while it was recognized that its friction coefficient was at a low level of 0.09.

A shoe having an outer peripheral surface which was smaller in radius of curvature than the inner peripheral surface of the ring was prepared from the inventive sample No. 1 in Table 3 and subjected to an endurance test similarly to the above. In this case, the shoe was only locally in contact with the ring, to cause seizing.

EXAMPLE 3

The sintered copper alloy sample No. 2 according to Example 1 of the present invention was worked into the shape of rings of N60 mm in outer diameter and N50 mm in inner diameter and thereafter press-fitted into guide cases prepared from various types of materials shown in Table 4, for preparing roller brake bodies of two-layer structures. Further, brake shoes made of an iron sintered material having a tensile strength of 650 MPa were assembled into the roller brake bodies, thereby forming dry roller brakes with no grease lubrication. Similarly to Example 2, these roller brakes were mounted on rear wheels of 24-inch bicycles, and an endurance test of 10000 cycles in total was made by pedaling the bicycles at a speed of 10 km/h., applying a lever input of 8 kgf (surface pressure by pressing force: about 30 kgf/cm$^2$) thereto, stopping the bicycles in five seconds and pedaling the same at a speed of 10 km/h. again every cycle. Thereafter states of the damage of spline teeth parts of the guide cases engaging with the rear wheel shafts and receiving high stress were observed, and friction coefficients $\mu$ between the brake shoes and the rings were measured in 1000 cycles. Table 4 shows the results.

As clearly understood from Table 4, no problems such as abrasive damage or breaking were caused in the spline teeth parts of the guide cases engaging with the rear wheels when the guide cases were prepared from metal materials having excellent strength and toughness. On the other hand, it was confirmed that the teeth parts were broken when the guide cases were prepared from ceramic materials which are strong and lightweight but inferior in toughness.

EXAMPLE 4

Sintered bodies were obtained by pressing and compacting mixed powder materials of hard particle dispersed copper alloy powder having the blending composition of the sample No. 2 in Table 1 and solid lubricating components (natural scaly graphite powder) in a true density ratio of 72% and solidifying the mixed powder materials on the basis of conditions shown in Table 5 respectively, and were then subjected to evaluation of transverse rupture strength. Table 5 shows the results. In re-pressurization steps, lubricants for inner walls of molds were prepared by dissolving zinc stearate in organic solvents.

TABLE 4

| Sample No. | Type of Material for Guide Case | Friction Coefficient $\mu$ | State of Damage of Spline Teeth Parts in Endurance Test Number of Times of Endurance Test (Cycles) | | |
|---|---|---|---|---|---|
| | | | 100 | 1000 | 10000 |
| 1 | aluminum alloy | 0.41 | excellent (no damage) | excellent (no damage) | excellent (no damage) |
| 2 | cast iron | 0.40 | excellent (no damage) | excellent (no damage) | excellent (no damage) |
| 3 | copper alloy | 0.40 | excellent (no damage) | excellent (no damage) | excellent (no damage) |
| 4 | magnesium alloy | 0.39 | excellent (no damage) | excellent (no damage) | excellent (no damage) |
| 5 | titanium alloy | 0.41 | excellent (no damage) | excellent (no damage) | excellent (no damage) |
| 6 | silicon nitride | 0.40 | excellent (no damage) | excellent (no damage) | teeth parts damaged in 2500 times |
| 7 | aluminum nitride | unmeasurable | excellent (no damage) | teeth part damaged in 630 times | test stopped |
| 8 | zirconia | 0.40 | excellent (no damage) | excellent (no damage) | teeth parts damaged in 3200 times |

TABLE 5

| No | Sintering Condition | | | Re-Pressurization Condition | | | Re-Sintering Condition | | | Transverse Rupture Strength of Sintered Body MPa | Remarks |
|---|---|---|---|---|---|---|---|---|---|---|---|
| | Temperature °C. | Time Min. | Atmosphere | Sintered Body Temperature °C. | Mold Temperature °C. | Surface Pressure t/cm$^2$ | Temperature °C. | Time Min. | Atmosphere | | |
| 1 | 850 | 30 | nitrogen | 400 | 150 | 8 | — | — | — | 325 | excellent sintered alloy obtained |
| 2 | 900 | 30 | hydrogen | 350 | 200 | 8 | — | — | — | 317 | excellent sintered alloy obtained |
| 3 | 780 | 30 | nitrogen | 200 | 180 | 8 | — | — | — | 312 | excellent sintered alloy obtained |

TABLE 5-continued

| | Sintering Condition | | | Re-Pressurization Condition | | | Re-Sintering Condition | | | Transverse Rupture | |
|---|---|---|---|---|---|---|---|---|---|---|---|
| No | Temperature °C. | Time Min. | Atmosphere | Sintered Body Temperature °C. | Mold Temperature °C. | Surface Pressure t/cm² | Temperature °C. | Time Min. | Atmosphere | Strength of Sintered Body MPa | Remarks |
| 4 | 900 | 20 | vacuum | 150 | 150 | 8 | — | — | — | 319 | excellent sintered alloy obtained |
| 5 | 900 | 30 | hydrogen | 350 | 200 | 8 | 850 | 30 | vacuum | 388 | excellent sintered alloy obtained |
| 6 | 900 | 30 | hydrogen | ordinary temperature | ordinary temperature | 8 | 850 | 30 | nitrogen | 322 | excellent sintered alloy obtained |
| 7 | 750 | 30 | nitrogen | 80 | ordinary temperature | 8 | 750 | 30 | nitrogen | 318 | excellent sintered alloy obtained |
| 8 | 600 | 60 | hydrogen | — | — | — | — | — | — | 165 | sintered body broken in the process of carriage |
| 9 | 900 | 5 | hydrogen | — | — | — | — | — | — | 140 | sintered body broken in the process of carriage |
| 10 | 850 | 30 | in the atmosphere | — | — | — | — | — | — | 155 | sintered body broken in the process of carriage |
| 11 | 1050 | 30 | vacuum | — | — | — | — | — | — | 395 | dimension remarkably changed by effusion of liquid phase |
| 12 | 900 | 30 | hydrogen | ordinary temperature | ordinary temperature | 8 | — | — | — | 188 | |
| 13 | 800 | 30 | nitrogen | ordinary temperature | ordinary temperature | 8 | 900 | 60 | nitrogen | 335 | dimension remarkably changed by progress of sintering |
| 14 | 900 | 30 | hydrogen | ordinary temperature | ordinary temperature | 2 | 850 | 30 | nitrogen | 175 | |

In Table 5, "—" indicates no execution.

As understood from Table 5, sintered bodies having sufficient strength (transverse rupture strength of at least 200 MPa) necessary for ring materials were obtained from the inventive sintered copper alloy samples Nos. 1 to 7 under proper sintering, re-pressurization and re-sintering conditions.

On the other hand, the comparative samples Nos. 8 to 14 caused the following problems:

Comparative Sample No. 8: Due to the low sintering temperature of 600° C., the sintering phenomenon insufficiently progressed to result in of the sintered body during breaking in the process of carrying the sintered body to the re-pressurization step.

Comparative Sample No. 9: Due to the short sintering time of five minutes, the sintering phenomenon insufficiently progressed to result in breaking of the sintered body during the process of carrying the sintered body to the re-pressurization step.

Comparative Sample No. 10: Due to the sintering in the atmosphere, the sintering phenomenon insufficiently progressed to result in breaking of the sintered body during in the process of carrying the sintered body to the re-pressurization step.

Comparative Sample. No. 11: Due to the heating up to 1050° C. beyond the solidus curve temperature of the copper alloy forming the matrix, a liquid phase resulted in the sintered body to increase dimensional change.

Comparative Sample No. 12: Because a no re-sintering process was not carried out, it was not possible to attain a sufficient strength for serving as a ring material.

Comparative Sample No. 13: Due to heating up to 900° C. in the re-sintering step beyond the first sintering temperature (800° C.), the sintering progressed again to increase dimensional change in the final product.

Comparative Sample No. 14: Due to the small surface pressure of 2 t/cm² in the re-pressurization step, a sufficient strength for serving as a ring material was not attained.

EXAMPLE 5

A sintered copper alloy prepared by sintering and solidifying a mixed powder having the composition of the inventive sample No. 8 in Example 1 was worked into the shape of rings of N75 mm in outer diameter and N65 m in inner diameter under the inventive conditions, which in turn were press-fitted into guide cases of cast iron for preparing roller brake bodies of two-layer structures. Table 6 shows transverse rupture strength values of the obtained sintered copper alloys. Brake shoes prepared of an iron sintered material having tensile strength of 650 MPa were assembled into the roller brake bodies, for preparing dry roller brakes with no grease lubrication.

Similarly to Example 2, these roller brakes were mounted on rear wheels of 24-inch bicycles, and an endurance test of 1000 cycles in total was made by pedaling the bicycles at a speed of 25 km/h., applying various lever inputs shown in Table 6 thereto, stopping the bicycles in five seconds and pedaling the same at a speed of 25 km/h. again every cycle. Friction coefficients $\mu$ between the brake shoes and the rings were measured. Table 6 shows the results.

TABLE 6

| Sample No. | Transverse Rupture Strength of Sintered Alloy MPa | Lever Input kgf/cm² | Friction Coefficient Number of cycles of Endurance Test (times) | | Remarks |
|---|---|---|---|---|---|
| | | | 100 | 1000 | |
| 1 | 280 | 10 | 0.42 | 0.41 | no damage |
| 2 | 280 | 38 | 0.41 | 0.41 | no damage |
| 3 | 345 | 45 | 0.41 | 0.42 | no damage |
| 4 | 345 | 85 | 0.42 | 0.40 | no damage |

TABLE 6-continued

| Sample No. | Transverse Rupture Strength of Sintered Alloy MPa | Lever Input kgf/cm$^2$ | Friction Coefficient Number of cycles of Endurance Test (times) 100 | 1000 | Remarks |
|---|---|---|---|---|---|
| 5 | 280 | 140 | 0.39 | — | ring body abraded |
| 6 | 345 | 150 | 0.41 | — | ring body abraded |

As seen from the inventive samples Nos. 1 to 4 in Table 6, it was possible to exhibit stable friction coefficients (braking force) with no abrasive damage of the sintered copper alloy ring materials when lever inputs (force for pressing the shoes against the rings) of about 10 to 100 kgf/cm$^2$ were applied thereto in racing cycles and general bicycles to which the present invention is directed. As seen from the comparative samples Nos. 5 and 6, on the other hand, it was confirmed that the ring materials were abrasively damaged when overloads of about 150 kgf/cm$^2$ were applied thereto as lever inputs.

According to the inventive roller brake, as hereinabove described, a high braking force corresponding to a friction coefficient of 0.1 to 0.5 can be stably exhibited with neither seizing/locking, nor abrasive damage, nor abnormal sound such as squeaking between the ring and the brake shoe forming the roller brake when a pressing force of about 10 to 50 kgf/cm$^2$ is applied thereto under heavy frictional sliding conditions without intervention of a lubricating component such as grease or oil. Therefore, the roller brake according to the present invention can attain high effectiveness with a relatively small lever input without locking causing seizing of the roller brake during running, and has excellent braking efficiency.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A drum brake arrangement for a vehicle wheel, comprising:
   a guide case that is adapted to be fixed to a wheel of a vehicle and that is adapted to rotate with said wheel;
   a ring fixedly fitted into said guide case; and
   a brake shoe that comprises an iron material and that is arranged to be pressable against an inner peripheral surface of said ring so as to cause friction relative to said inner peripheral surface and exhibit a braking effect;
   wherein said ring comprises a sintered material including a matrix and hard particles dispersed in said matrix, said matrix comprises first and second copper alloy grains corresponding to sintered copper alloy powder grains, said first copper alloy grains contain said hard particles dispersed therein, and said second grains do not contain any hard particles therein.

2. The drum brake arrangement in accordance with claim 1, wherein said brake shoe consists essentially of said iron material, which has a tensile strength of at least 400 MPa.

3. The drum brake arrangement in accordance with claim 1, wherein said rind consists essentially of said sintered material, which has a transverse rupture strength of at least 200 MPa.

4. The drum brake arrangement in accordance with claim 1, wherein said friction between said ring and said brake shoe exhibits a friction coefficient of at least 0.15 and not more than 0.5 when pressing said brake shoe against said ring in a dry sliding environment without an interposed solid lubricant and without an interposed semisolid lubricant.

5. The drum brake arrangement in accordance with claim 1, wherein said sintered material contains 10 to 50 percent by weight of said hard particles and further contains 5 to 15 percent by weight of a solid lubricating component in said matrix.

6. The drum brake arrangement in accordance with claim 5, wherein said matrix consists essentially of 3 to 20 percent by weight of Sn relative to the total weight of said matrix, and a remainder of copper and unavoidable impurities.

7. The drum brake arrangement in accordance with claim 5, wherein said hard particles are particles of at least one iron intermetallic compound selected from a group consisting of FeMo, FeCr, FeTi, FeAl, FeSi and FeB.

8. The drum brake arrangement in accordance with claim 7, wherein said hard particles have a maximum particle diameter of not more than 30 μm and a mean particle diameter of not more than 15 μm.

9. The drum brake arrangement in accordance with claim 7, wherein said hard particles are particles of at least two of said intermetallic compounds.

10. The drum brake arrangement in accordance with claim 5, wherein said solid lubricating component is natural graphite powder.

11. The drum brake arrangement in accordance with claim 5, wherein said matrix consists essentially of 3 to 20 percent by weight of Sn and a positive amount not more than 3 percent by weight of Al relative to the total weight of said matrix, and a remainder of copper and unavoidable impurities.

12. The drum brake arrangement in accordance with claim 5, wherein said matrix consists essentially of 5 to 40 percent by weight of Zn and/or Ni and 3 to 20 percent by weight of Sn relative to the total weight of said matrix, and a remainder of copper and unavoidable impurities.

13. The drum brake arrangement in accordance with claim 5, wherein said matrix consists essentially of 5 to 40 percent by weight of Zn and/or Ni, 3 to 20 percent by weight of Sn and a positive amount not more than 3 percent by weight of Al relative to the total weight of said matrix, and a remainder of copper and unavoidable impurities.

14. The drum brake arrangement in accordance with claim 1, wherein said guide case consists essentially of a material selected from a group consisting of an iron-based alloy, an aluminum alloy, a magnesium alloy, a copper alloy and a titanium alloy.

15. The drum brake arrangement in accordance with claim 1, wherein
   said ring has a convex part on an outer peripheral surface of said ring,
   said guide case has a concave part on an inner peripheral surface of said guide case, and
   said ring is press-fitted into said guide case and fixed thereto with said convex part engaging said concave part.

16. The drum brake arrangement in accordance with claim 1, excluding grease and excluding oil interposed between said brake shoe and said ring.

17. A drum brake arrangement for a vehicle wheel, comprising:
   a guide case that is adapted to be fixed to a wheel of a vehicle and that is adapted to rotate with said wheel;

a ring comprising a sintered copper alloy material fixedly fitted into said guide case; and a brake shoe that comprises an iron material and that is arranged to be pressable against an inner peripheral surface of said ring so as to cause friction relative to said inner peripheral surface and exhibit a braking effect;

wherein:

said ring has a convex part on an outer peripheral surface of said ring;

said guide case has a concave part on an inner peripheral surface of said guide case; and said ring is press-fitted into said guide case and fixed thereto with said convex part engaging said concave part.

18. The drum brake arrangement in accordance with claim 17, wherein said sintered copper alloy material comprises a matrix and hard particles dispersed in said matrix.

19. The drum brake arrangement in accordance with claim 18, wherein said matrix comprises copper alloy grains corresponding to sintered copper alloy powder grains, and said hard particles are dispersed and present in the interiors of said copper alloy grains.

20. The drum brake arrangement in accordance with claim 18, wherein said matrix comprises first and second copper alloy grains corresponding to sintered copper alloy powder grains, said first copper alloy grains contain said hard particles dispersed therein, and said second copper alloy grains contain no hard particles therein.

21. The drum brake arrangement in accordance with claim 17, wherein said brake shoe consists essentially of said iron material, which has a tensile strength of at least 400 MPa.

22. The drum brake arrangement in accordance with claim 17, wherein said ring consists essentially of said sintered copper alloy material, which has a transverse rupture strength of at least 200 MPa.

23. The drum brake arrangement in accordance with claim 17, wherein said friction between said ring and said brake shoe exhibits a friction coefficient of at least 0.15 and not more than 0.5 when pressing said brake shoe against said ring in a dry sliding environment without an interposed solid lubricant and without an interposed semisolid lubricant.

24. The drum brake arrangement in accordance with claim 17, wherein said sintered copper alloy material contains 10 to 50 percent by weight of said hard particles and further contains 5 to 15 percent by weight of a solid lubricating component in said matrix.

25. The drum brake arrangement in accordance with claim 17, wherein said matrix consists essentially of 3 to 20 percent by weight of Sn relative to the total weight of said matrix, and a remainder of copper and unavoidable impurities.

26. The drum brake arrangement in accordance with claim 24, wherein said hard particles are particles of at least one iron intermetallic compound selected from a group consisting of FeMo, FeCr, FeTi, FeAl, FeSi and FeB.

27. The drum brake arrangement in accordance with claim 26, wherein said hard particles have a maximum particle diameter of not more than 30 $\mu$m and a mean particle diameter of not more than 15 $\mu$m.

28. The drum brake arrangement in accordance with claim 26, wherein said hard particles are particles of at least two of said intermetallic compounds.

29. The drum brake arrangement in accordance with claim 24, wherein said solid lubricating component is natural graphite powder.

30. The drum brake arrangement in accordance with claim 24, wherein said matrix consists essentially of 3 to 20 percent by weight of Sn and a positive amount not more than 3 percent by weight of Al relative to the total weight of said matrix, and a remainder of copper and unavoidable impurities.

31. The drum brake arrangement in accordance with claim 24, wherein said matrix consists essentially of 5 to 40 percent by weight of Zn and/or Ni and 3 to 20 percent by weight of Sn relative to the total weight of said matrix, and a remainder of copper and unavoidable impurities.

32. The drum brake arrangement in accordance with claim 24, wherein said matrix consists essentially of 5 to 40 percent by weight of Zn and/or Ni, 3 to 20 percent by weight of Sn and a positive amount not more than 3 percent by weight of Al relative to the total weight of said matrix, and a remainder of copper and unavoidable impurities.

33. The drum brake arrangement in accordance with claim 17, wherein said guide case consists essentially of a material selected from a group consisting of an iron-based alloy, an aluminum alloy, a magnesium alloy, a copper alloy and a titanium alloy.

34. The drum brake arrangement in accordance with claim 17, wherein said convex part comprises a plurality of gear teeth protruding convexly from said outer peripheral surface of said ring, said concave part comprises a plurality of gear tooth grooves let concavely into said inner peripheral surface of said guide case, and said gear teeth are meshed and engaged respectively into said gear tooth grooves.

* * * * *

UNITED STATES PATENT AND TRADEMARK OFFICE
CERTIFICATE OF CORRECTION

PATENT NO. : 5,975,256

DATED : Nov. 2, 1999

INVENTOR(S) : Katsuyoshi Kondoh et al.

It is certified that error appears in the above-identified patent and that said Letters Patent is hereby corrected as shown below:

Col. 4,      line 17, after "material" delete "is at";
                 line 42, after "economy," delete "further, selected";

Col. 6,      line 50, after "matrix" insert --,--;

Col. 9,      line 5, after "gas," insert -- an --; after "gas" (second occurrence), delete "an";
                 line 25, before "transverse" insert -- a --;
                 line 26, before "attained" delete "a";

Col. 12,     line 41, after "alloying" insert -- a --; after "mixed" delete "a";

line 65, after "into" insert -- the form of --;

UNITED STATES PATENT AND TRADEMARK OFFICE
CERTIFICATE OF CORRECTION

PATENT NO. : 5,975,256

DATED : Nov. 2, 1999

INVENTOR(S) : Katsuyoshi Kondoh et al.

It is certified that error appears in the above-identified patent and that said Letters Patent is hereby corrected as shown below:

```
Col. 19,    line 41, after "in" insert -- breaking --;
            line 42, before "the" (first occurrence), delete "breaking in";
            line 51, after "during" delete "in";
            line 58, before "re-sintering" delete "no";

Col. 20,    In Table 6, col. 4, line 3, replace "(times)" by --(Cycles)--;

Col. 21,    In Table 6, col. 4, line 3, replace "(times)" by --(Cycles)--;

Col. 23,    line 49, before "wherein" replace "17," by -- 24,--;
```

Signed and Sealed this

Eleventh Day of July, 2000

*Attest:*

Q. TODD DICKINSON

*Attesting Officer*            *Director of Patents and Trademarks*

UNITED STATES PATENT AND TRADEMARK OFFICE
CERTIFICATE OF CORRECTION

PATENT NO. : 5,975,256

DATED : Nov. 2, 1999

INVENTOR(S) : Katsuyoshi Kondoh et al.

It is certified that error appears in the above-identified patent and that said Letters Patent is hereby corrected as shown below:

Col. 4,      line 17, after "material" delete "is at";
                 line 42, after "economy," delete "further, selected";

Col. 6,      line 50, after "matrix" insert --,--;

Col. 9,      line 5, after "gas," insert -- an --; after "gas" (second occurrence), delete "an";
                 line 25, before "transverse" insert -- a --;
                 line 26, before "attained" delete "a";

Col. 12,     line 41, after "alloying" insert -- a --; after "mixed" delete "a";

Col. 15,     line 65, after "into" insert -- the form of --;

UNITED STATES PATENT AND TRADEMARK OFFICE
CERTIFICATE OF CORRECTION

PATENT NO. : 5,975,256

DATED : Nov. 2, 1999

INVENTOR(S) : Katsuyoshi Kondoh et al.

It is certified that error appears in the above-identified patent and that said Letters Patent is hereby corrected as shown below:

Col. 19, line 41, after "in" insert -- breaking --;
line 42, before "the" (first occurrence), delete "breaking in";
line 51, after "during" delete "in";
line 58, before "re-sintering" delete "no";

Col. 20, In Table 6, col. 4, line 3, replace "(times)" by --(Cycles)--;

Col. 21, In Table 6, col. 4, line 3, replace "(times)" by --(Cycles)--;

Col. 23, line 49, before "wherein" replace "17," by -- 24,--;

This certificate supersedes Certificate of Correction issued July 11, 2000.

Signed and Sealed this

Twenty-second Day of August, 2000

Attest:

Q. TODD DICKINSON

*Attesting Officer*   *Director of Patents and Trademarks*